Figure 1A:
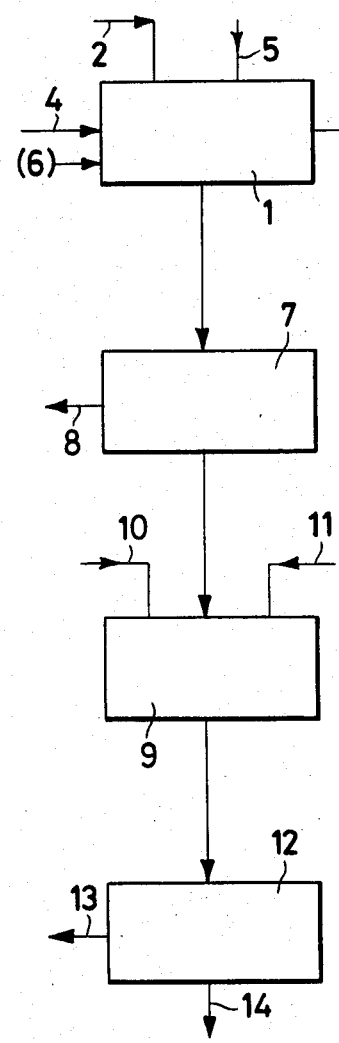

United States Patent [19]

Cammi et al.

[11] Patent Number: 4,637,832
[45] Date of Patent: Jan. 20, 1987

[54] PROCESS FOR PURIFYING SOLUTIONS OF ZINC SULPHATE

[75] Inventors: Sergio Cammi, Rome; Arturo D'Este, Venice; Alessandro Pescetelli, Rome, all of Italy

[73] Assignee: SAMIM Societa Azionaria Minero-Mettallurgica, S.p.A., Rome, Italy

[21] Appl. No.: 636,815

[22] Filed: Aug. 1, 1984

[30] Foreign Application Priority Data

Aug. 2, 1983 [IT] Italy ............................. 22388 A/83
Feb. 10, 1984 [IT] Italy ............................. 19556 A/84

[51] Int. Cl.4 ............................................. C01G 9/06
[52] U.S. Cl. ........................................ 75/109; 75/117; 75/119; 75/120; 75/121; 423/101; 423/106; 423/109; 423/87; 423/140; 204/119
[58] Field of Search ................. 423/101, 106, 109, 87, 423/140; 75/109, 101 R, 117, 119, 120, 121; 204/119

[56] References Cited

U.S. PATENT DOCUMENTS

| 2,509,917 | 5/1950 | Griffith et al. | 204/119 |
| 2,509,918 | 5/1950 | Griffith et al. | 204/119 |
| 3,826,648 | 7/1974 | Bodson | 75/109 |
| 4,049,514 | 9/1977 | Freeman et al. | 75/109 |
| 4,078,040 | 3/1978 | Milkov et al. | 75/109 |
| 4,168,970 | 9/1979 | Ghastas | 75/109 |

Primary Examiner—John Doll
Assistant Examiner—Robert L. Stoll
Attorney, Agent, or Firm—Birch, Stewart, Kolasch & Birch

[57] ABSTRACT

A process for purifying aqueous solutions of zinc sulphate removed from leaching processes and containing metals such as Cu, Cd, Ti, Ni, Co, Ge, As, Sb which consists in cementing said metals with zinc dust and with a couple of activators chosen between Cu-As and Cu-Sb in one or more reaction vessels having a bottom portion of cylindrical shape, an intermediate portion of cone frustum shape, and a top portion having an enlarged section thereof.

20 Claims, 10 Drawing Figures

PROCESS FOR PURIFYING SOLUTIONS OF ZINC SULPHATE

The present invention relates to a process for the removal (purification) by means of cementation with zinc dust, of the impurities contained in a zinc sulphate solution intended for the production of zinc by electrolysis.

The classic hydrometallurgical method for the production of electrolytic zinc comprises a first step (leaching) in which the impurities containing zinc oxide is dissolved by means of sulphuric acid recovered from the electrolysis.

The end pH of the resulting solution is around 5,4, so that the precipitation is obtained of the suitably added $Fe^{+3}$ which, by coprecipitation, drags with itself those impurities whose hydrolysis pH is lower than zinc. Such impurities are arsenic, iron, antimony, germanium, tin and other elements.

In the solution of zinc sulphate, however other (not hydrolysed) impurities remain, such as cadmium, copper, thallium, cobalt, nickel and possible traces of the previously mentioned impurities.

The residual impurities are harmful for the electrodeposition of zinc both because they are codeposited together with the zinc, thus polluting the cathodic deposit (cadmium, copper, thallium), and because, by reducing the hydrogen overvoltage, they promote their development at the cathode instead of zinc (Ge, Sb); and because, by being deposited together with the zinc, they form with it galvanic microcouples in which the zinc acts as the anode, which is redissolved (Co, Ni).

The withdrawal of the said impurities is the second step (purification) of the hydrometallurgical process, while the third step is the electrodeposition of zinc from purified solutions (electrolysis).

Going back now to the second step, the impurities being discussed (cadmium, copper, thallium, cobalt, nickel, all of which are more electropositive than zinc) are cemented on the zinc dust. The cementation of the impurities Cu, Cd, Tl is simple and takes place at low temperature (50°-55° C.: the temperature of the leaching effluent), with no activator additives being necessary.

The cementation of Ni and, above all, Co is on the contrary, difficult and takes place only in the presence of an excess amount of zinc dust and with suitable activators at high temperatures (higher than 70° C.). The presence is moreover necessary in the solution of a substantial quantity of copper. The activators presently used are antimony ($Sb_2O_3$; Sb tartrate) and arsenic ($As_2O_3$). From them, this step is named either as the "antimony-purification" step or as the "arsenic-purification" step, according to the activator chosen.

The chosen purification process is then generally effected as a two stage process (the cold step is firstly carried out and then the high temperature step, or vice-versa), or as a three stage process, taking into account the purification efficiency, as well as the concentration (depending on the different streams) of the impurities to be removed, the separation of the impurities collected in the different cements of each stage, and the various consumptions. Copper and cadmium, due to their high concentrations, are always recovered. Obviously, the higher the concentration of the metal to be recovered in the cement, and the more the various metals (impurities) are already separated in different cements, the easier the following operations will be for the recovery of such metals.

Figure 1B:
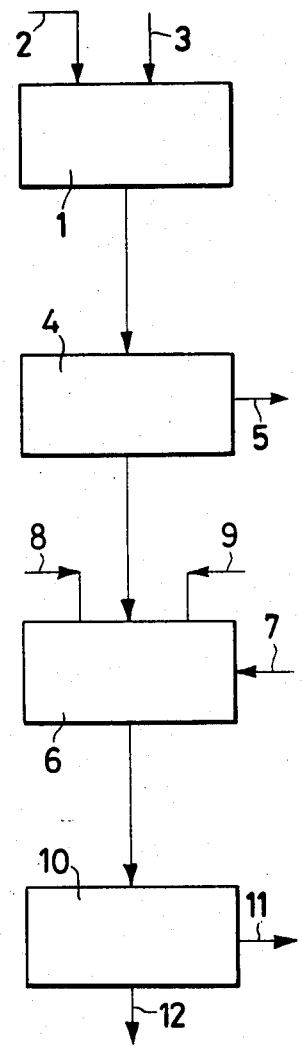

By means of two block diagrams, two presently used processes are illustrated in FIG. 1A and in FIG. 1B.

In FIG. 1A a process (A) is schematically shown in which the metals are cemented together.

In a first stage (1) the raw solution (2) is heated by means of steam (3), to it antimony (4), zinc dust (5) and possibly copper dust (6) are added.

At the end of the first stage a filtration is effected (7) by means of which cements (8) are withdrawn from the solution, containing Cu, Cd, Ni, Co. The solution is then sent to a second stage (9), copper (10) and zinc dust (11) are then added to it. At the end of the second stage another filtration (12) is carried out by which further cements (13) are separated thus obtaining the purified solution (14).

In FIG. 1B a process (B) is schematically shown in which the metals are not cemented all together.

In a first stage (1) to the raw solution (2) zinc dust (3) is added; at the end of the first stage a filtration (4) is effected separating copper and cadmium cements (5) from a solution which is sent to a second stage (6). In the second stage the solution is heated by steam (7), to it antimony (8) and zinc dust are added (9). At the end of second stage another filtration takes place (10) obtaining cements (11) of Ni, Co and a purified solution (12).

The operating parameters are now given for the two (A and B) antimony-processes, starting from a typical composition of a raw solution recovered from the leaching step:

| | Zn | Cu | Cd | Tl | Co | Ni |
|---|---|---|---|---|---|---|
| g/l | 140 | 0.2–0.5 | 0.1–0.5 | 0.01–0.05 | 0.005–0.025 | 0.001–0.01 |

T = 50–55° C.
pH = 5,4

PROCESS A

First stage:
 T=71°–75° C.
 Blown zinc dust=5–6 g/l
 Sb=1 Sb/1 Co
 Cu=Fed stream
 Retention time=3–4 hours
Second stage:
 Blown zinc dust=2 g/l
 Cu=0.1 g/l
 Retention time=1.5–2 hours

PROCESS B

First stage:
 T=Fed stream
 Blown zinc dust=2 g/l
 Cu=Fed stream
 Retention time=1–2 hours
Second stage:
 T=85°–90° C.
 Sb=0.05–0.1 Sb/1 Co
 Distilled zinc dust=4 g/l
 Pb(PbO)=1% by weight of the Zn dust
 Retention time=3 hours These operations are carried out in stirred vats and the filtering is effected through pressure filters.

From the retention times the necessary reaction volume clearly appears; 100 cu·m/h of solution, e.g., treated in a continuous process in two stages in a total of 500-600 cu.m of reaction vessels.

The filtrations related to the overall flow rate are two; the weight and the composition of the separated cements are clearly related to the quantity of zinc dust used. Moreover, redissolving problems can be met during the filtration.

It has been surprisingly found a process for the second step (purifying) of the hydrometallurgical process for the production of electrolytic zinc which gives, whatever is the type of purification chosen and for all the stages thereof, the following advantages:

a notable reduction (of about 50%) of the zinc dust consumption;

a notable reduction in the temperature of the high-temperature stage of cobalt cementation;

a high concentration of the cemented metal in the relevant cement;

a notable reduction of the overall dimensions of the reaction equipment and of auxiliary equipment (stirrers, filters, and so on).

The process according to the present invention, for the cementation of Cu, Cd, Tl, Ni, Co, Ge, As, Sb contained in aqueous solutions of zinc sulphate recovered from leaching, comprises carrying out the cementation with zinc dust and a couple of activators chosen between Cu-As and Cu-Sb in one or more reaction vessels, disposed in series or in parallel with respect to each other, said vessels having a bottom cylindrically spaced portion, a cone frustum shaped intermediate portion connected to the cylindrically shaped portion, and a top portion which is an enlarged section. The base angle of the cone frustum portion relatively to the vertical is within the range of from 10° to 15°.

The aqueous solution of zinc sulphate containing the metals to be cemented is fed upwards from the bottom of the cylindrically shaped portion, laterally, at a speed, referred to the flowing section of the cylindrically shaped portion, within the range of from 0.02 to 0.07 m/s, and preferably of from 0.03 to 0.04 m/s; the zinc dust, which is the cementing agent, is fed into the cylindrically shaped portion above the feeding point of the zinc sulphate solution.

The retention time is comprised between 3 and 12 minutes. The zinc dust fed to the reaction vessel(s) has a granulometry in the range from 0.01 to 1 mm, and more preferably from 0.01 to 0.5 mm.

The cementation can be carried out as a one stage or a two stages process.

When two stages are adopted, in the first stage the cementation is carried out of Cu, Cd, Tl and a share of Ni with zinc dust in a single reactor or in two reactors, in the second stage the cementation is carried out of Co and of the residual Ni with zinc dust and also in the presence of copper combined with either arsenic or antimony in a single reaction vessel, or in two reaction vessels. More precisely in the case of two stages, the reactors used can be either two, or three or four.

The retention time for the cementation of copper and cadmium is within the range of from 3 to 6 minutes, for the cementation of Co of from 8 to 12 minutes.

When a single stage is adopted, in which the various metals to be removed are cemented all together, either a single reactor, or two reactors can be used.

Figure 2A:
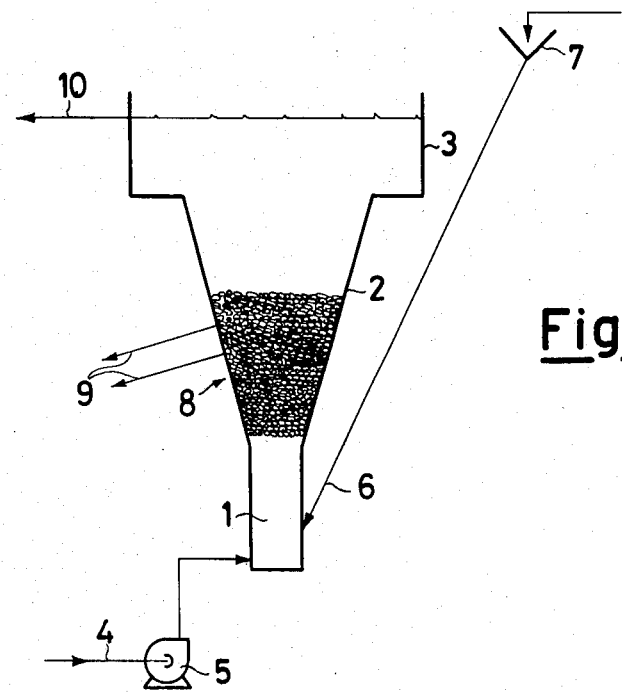

By using the FIG. 2A, the reaction vessel is now described which is used in the process of the present invention.

The reaction vessel consists of a bottom portion cylindrically shaped (1), a cone frustum shaped intermediate portion (2) connected to the cylindrically shaped portion, and a top portion with an enlarged section (3).

In the cylindrically shaped portion the inlet is laterally provided with both the solution of zinc sulphate (4) by means of a pump (5), and zinc dust (6) introduced through a lateral tank (7) whose level is higher than the reactor overflow (communicating tubes).

In the cone frustum portion a fluid bed (8) is formed of particles of cements and particles (dust) of zinc which have reacted only partly, such bed being held in suspension by the flow of the solution to be purified.

The base angle of the cone frustum portion relatively to the vertical is within the range of from 10° to 15°.

In the cone frustum shaped portion an equilibrium is established between the settling speed of the solid particles and the upwards speed of the solution, thus creating the fluid bed which has a concentration of suspended solids of from 100 to 500 g/l, and preferably of from 200 to 400 g/l. In the upper half of the cone frustum portion and still more in the top enlarged section portion, due to the large decrease of the upwards speed of the solution, the decantation takes place of the lighter solid particles. The cements are discharged, either continuously or batchwise from the fluid bed (9), the purified solution is discharged from the top enlarged section portion (10).

The speed, within the flow section of the cylindrically shaped portion, is within the range of from 0.02 to 0.07 m/o, and preferably of from 0.03 to 0.04 m/s.

The retention time for the cementation of Cu and Cd is between 3 and 6 minutes, and between 8 and 12 minutes for the cementation of Co.

The application of the reactor shown in FIG. 2A to the processes (A) and (B) previously described leads to the following operational data:

PROCESS A

Single stage:
 T=60°-70° C.
 Blown zinc dust=2.5-3.5 g/l
 Sb=0.5-1 Sb/1 Co
 Cu=Fed stream
 Retention time=8-12 minutes

PROCESS B

First stage:
 T=Fed stream
 Blown zinc dust=1-1.2 g/l
 Cu=Fed stream
 Retention time=3-6 minutes
Second stage:
 T=60°-70° C.
 Sb=0.5-1 Sb/1 Co
 Blown zinc dust=2.5-3.5 g/l
 Cu=0.1-0.4 g/l
 Pb (PbO) ———
 Retention time=8-12 minutes With reference with the earlier A process, a second stage is not necessary, whereas with reference to the earlier process B, the intermediate filtering between the 1st and the 2nd stage is not necessary. In both processes, finally, the end filtering is greatly reduced.

Figure 2B:
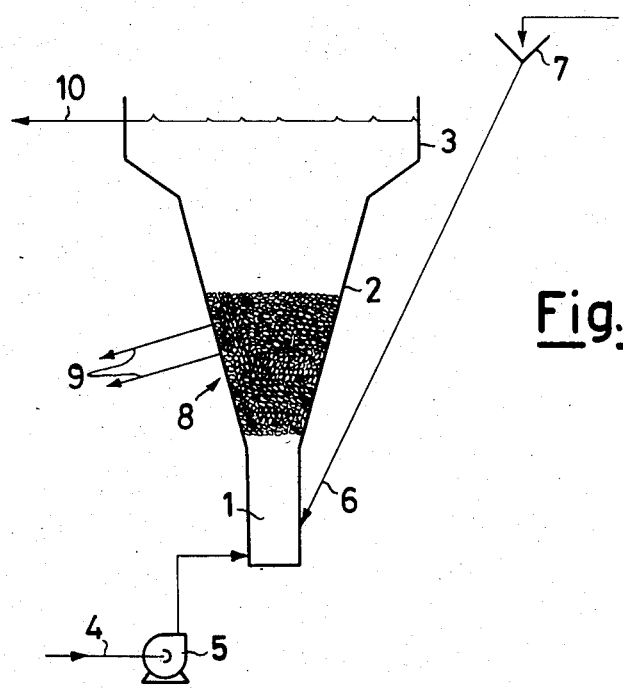

The reaction vessel can be modified as it is schematically shown in FIG. 2B without the right angle of the top enlarged section portion.

The invention is now illustrated with the aid of the schematic views shown in the attached FIGS. 3, 4, 5, 6, 7 and 8, which represent preferred embodiments, which are not to be considered as limitative of the invention itself.

Figure 3:
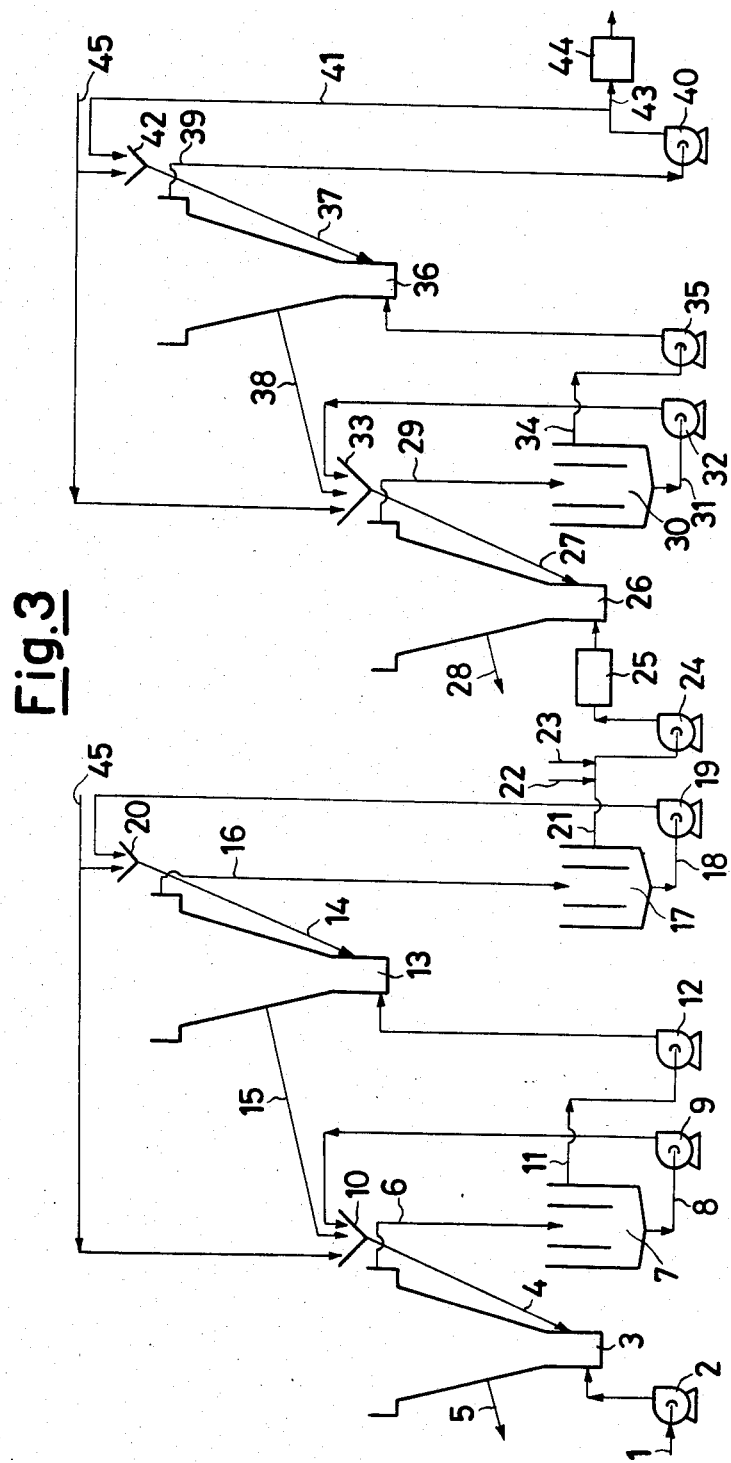

In FIG. 3 a layout of the process of the invention is shown, using two stages and four reaction vessels.

The zinc sulphate solution (1) to be purified, without having been heated, enters, through a pump (2), the cylindrically shaped portion of the reactor (3). Also the zinc dust is introduced (4) in the cylindrical portion at a point which is positioned above the feeding inlet of the solution. The reaction is carried out in the reactor (3) with a retention time of about 5 minutes. The cement (5) containing Cu, Cd, Tl, Ni is discharged from the cone frustum shaped portion, whilst the purified solution (6) is discharged from the top enlarged section portion of the reactor and is sent to a decanter tank (7) (retention time of about 10 to 15 minutes), from whose bottom a slurry of cements (8) escapes which by means of a pump (9) is fed to the collecting vat (10) from which it is then recycled to the reaction vessel. The clarified solution (11) is fed by means of a pump (12) to a second reactor (13) to which zinc dust is fed (14); from the reactor (13) (retention time of about 5 minutes) a cement is discharged from the cone frustum shaped portion essentially containing zinc (15) which is sent to the vat (10), and from the enlarged portion the solution (16), essentially deprived of Cu, Cd, Tl, and partly deprived of Ni, is sent to a decanter tank (17) (retention time 10 to 15 minutes) from whose bottom a slurry of zinc dust escapes (18) which is recycled by means of a pump (19) to the vat (20).

The clarified solution (21) is sent to the second stage of purification.

In the second stage to the solution antimony (22) and copper (23) are added. The solution is then sent, by means of a pump (24), after having been heated at a temperature between 60° and 70° C. in a steam/solution exchanger (25), to the reaction vessel (26) to which zinc dust (27) is fed.

From the reaction vessel (retention time of about 8-12 minutes) a cement (28) is discharged containing Co and Ni and a solution (29) is drawn which is then sent to a decanter tank (30) (retention time of 15-20 minutes).

From the bottom of the tank (30) a slurry (31) of cements is recycled to the reactor (26) through a pump (32) and a collecting vat (33). The clarified solution (34) is fed by a pump (35) to the reactor (36) to which zinc dust (37) is fed. From the reactor (retention time not higher than 8-12 minutes) a cement is discharged essentially containing zinc (38) which is sent to the vat (33) and the solution (39) is drawn essentially purified also from Co and Ni, Sb, As, Ge, which through a pump (40) is partly (41) recycled and sent to the collecting tank (42) and partly (43) filtered by a plate filter press (44) before being sent to the electrolysis. The zinc dust is fed to the collecting vats (10), (20), (33), (42) by the lines (45).

The decanter tanks (7), (17) and (30) can be substituted by hydrocyclones.

Figure 4:
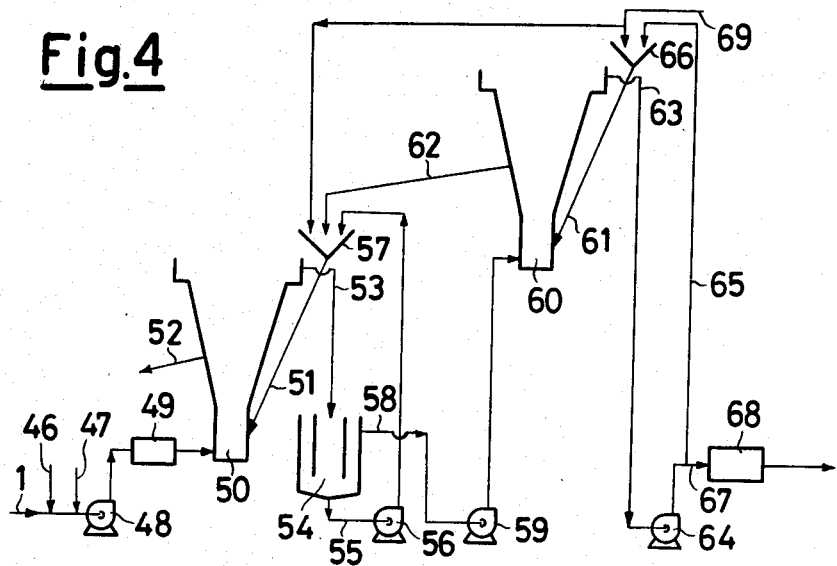

In FIG. 4 another layout is shown of a process carried out in a single step with two reactors.

To the raw solution (1) copper (46) and antimony (47) are added, and the solution is then fed by means of a pump (48), after having been heated at a temperature of 60° to 70° C., in the steam/solution exchanger (49), to the reactor (50) to which zinc dust (51) is fed.

From the reactor (50) (retention time of about 10 minutes) a cement (52) is discharged containing Co, Ni, Cu, Sb, Cd, As, Ge, Tl, and a solution (53) is discharged which is sent to a decanter tank (54) from which (retention time not higher than 15-20 minutes) a slurry of cements (55) is recovered, which is sent through a pump (56) to a collecting tank (57) and is then recycled to the reactor (50). The clarified solution (58) is fed through a pump (59) to the reaction vessel (60), to which zinc dust (61) is fed. From the reaction vessel (60) (retention time lower than 10 minutes), a cement is discharged essentially containing zinc (62) which is sent to the tank (57) and a solution (63) is discharged, pumped by (64), which, essentially purified, is partly (65) recycled to the collecting tank (66) and partly (67) is sent to the filtration step by a plate filter press (68) before being sent to the electrolysis. The zinc dust is fed to the collecting tanks (57) and (66) through the line (69). Also in this layout, the decanter tank (54) can be substituted by hydrocyclones.

Figure 5:
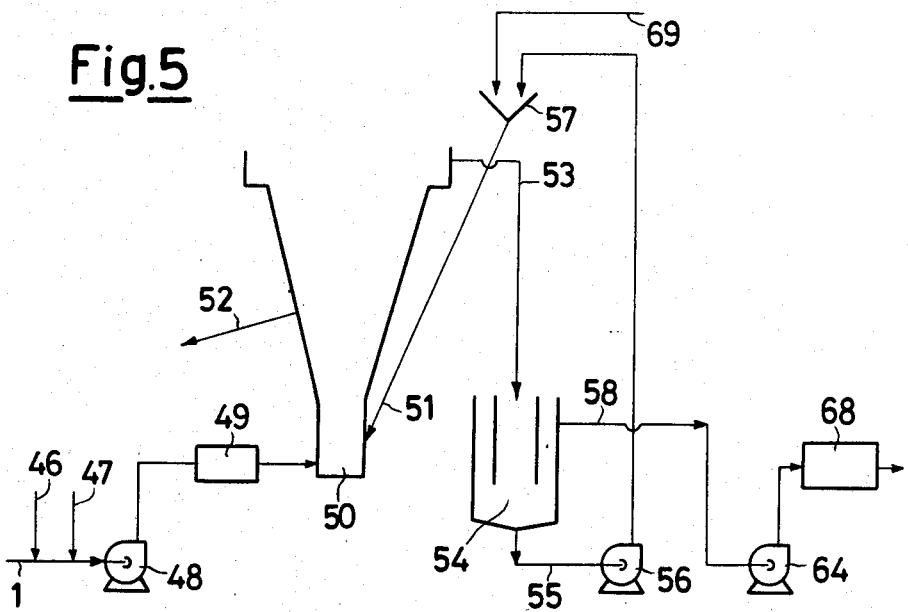

In FIG. 5, a one stage process is shown using one reactor only.

The raw solution (1), to which copper (46) and antimony (47) have been added, is sent by a pump (48), after having been heated in the steam/solution exchanger (49) at a temperature within the range of from 60° to 70° C., to the reactor (50) to which zinc dust (51) is fed.

From the reactor (50) (retention time 10 minutes), a cement (52) is discharged containing Co, Ni, Cu, Tl, Sb, As, Ge, Cd and from the top portion a solution (53) is discharged which is sent to a decanter tank (54).

From the tank (54) (retention time 15-20 minutes) a slurry is recovered of cements (5), which is sent by the pump (56) to the collecting vat (57) for being then recycled to the reactor. The clarified solution (58), pumped by (64) is filtered in a plate filter press (68) and is then sent to the electrolysis. The zinc dust is fed to the collecting vat (57) by the line (69). As in the preceding outlines, the hydrocyclones can substitute the decanter tank (54).

Figure 6:
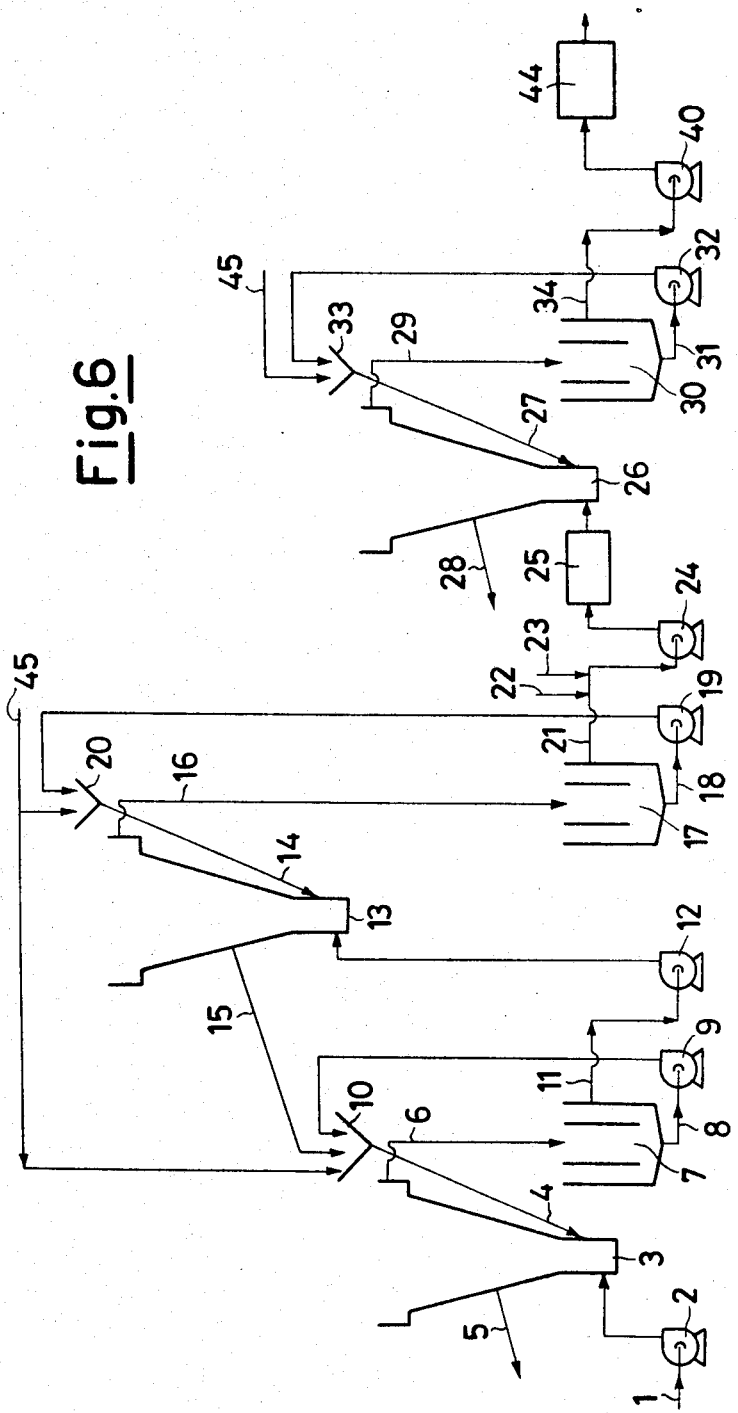

In FIG. 6 a two stage process is shown using two reactors in the first stage and one reactor in the second stage.

This is a simplified layout compared with that shown in FIG. 3. The meaning of the reference numbers and the retention times are the same as those of FIG. 3.

Figure 7:
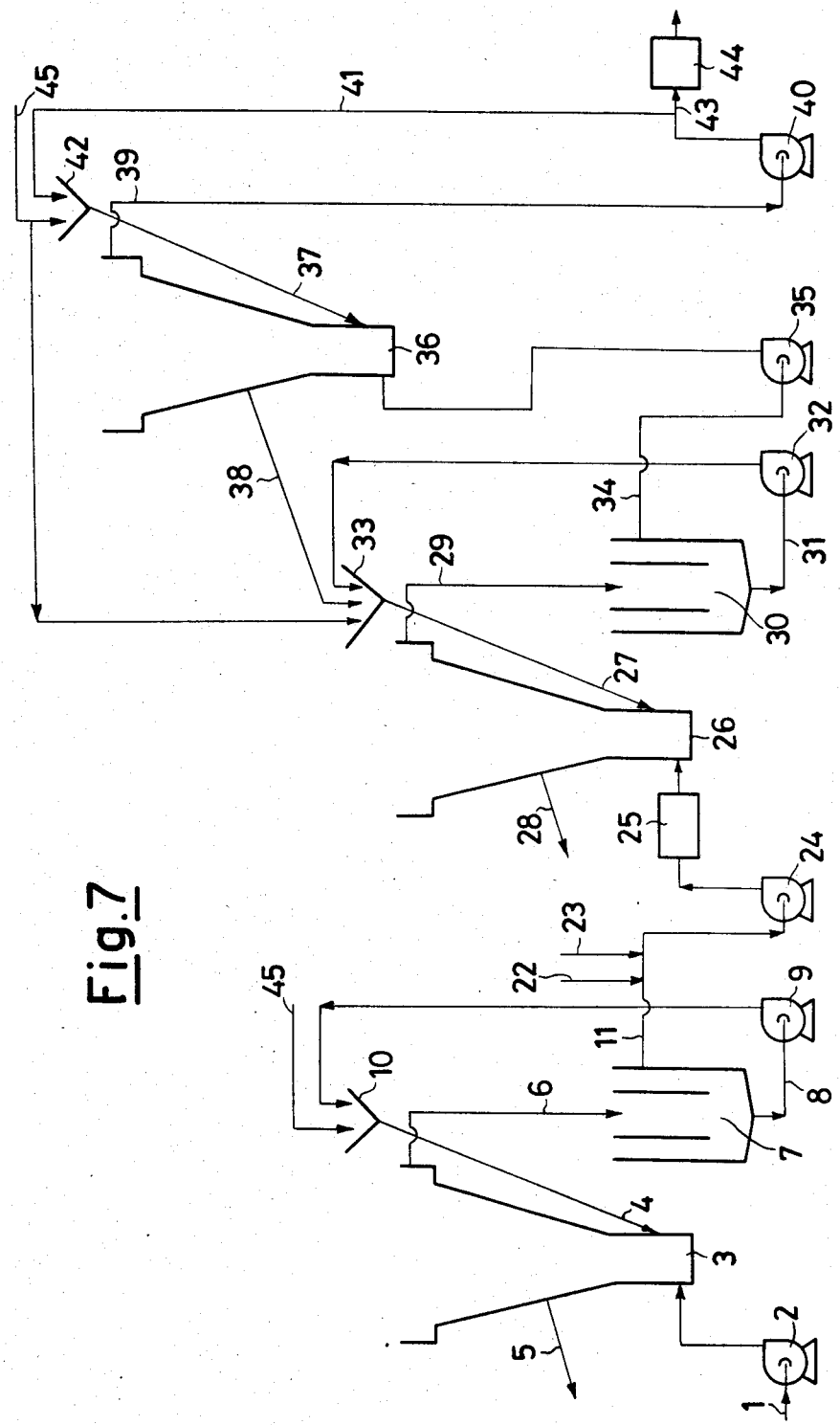

In FIG. 7 a two stage simplified process is shown compared to that of FIG. 3, using one reactor in the first stage and two reactors in the second stage.

Figure 8:
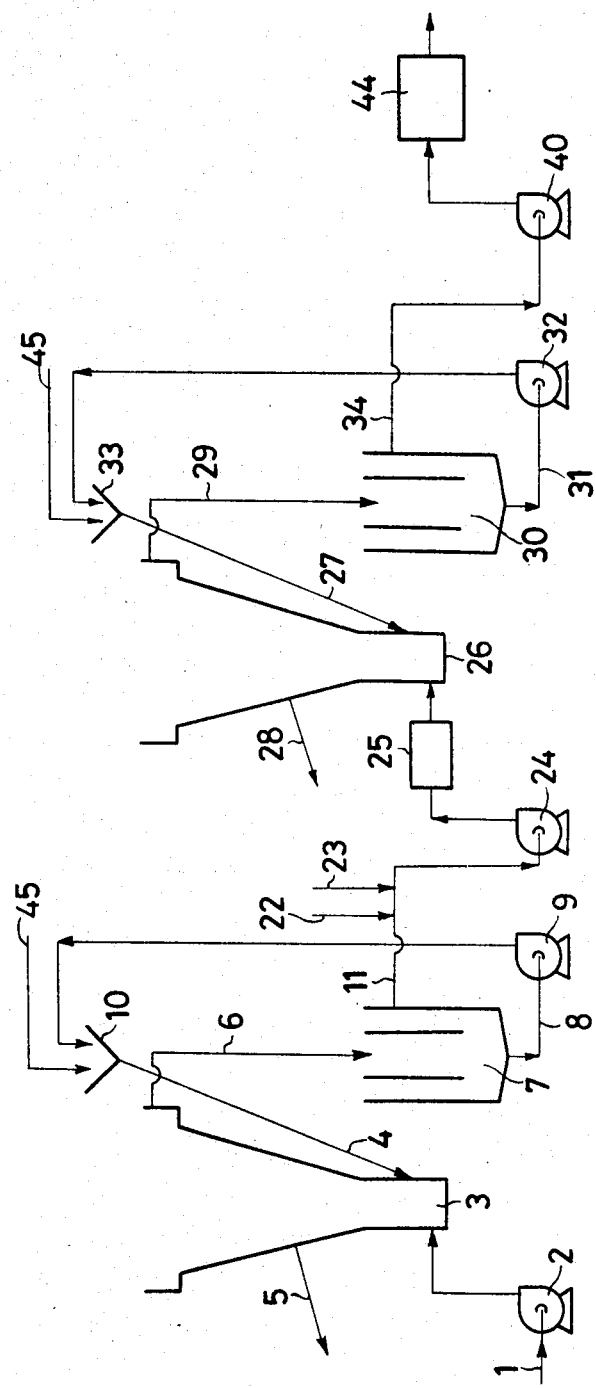

In FIG. 8 a two stage process is shown, simplified as compared to the preceding two stage above outlined processes, using one reactor in the first stage and one reactor in the second stage.

In the layouts of the FIGS. 6, 7 and 8, the solution to be purified is not heated in the first stage, whilst the solution outcoming from the first stage is heated before being fed to the reactor or to the first reactor of the second stage, at a temperature within the range of from 60° to 70° C.

As it can be seen from the layouts, only one filtering step is provided, at the end of the process, of the solution being fed to the electrolysis, Such filtration is additionally greatly reduced, as for the solids to be separated as compared to the conventional processes, in that the 2nd reactor in each stage, whose bed is essentially consisting of zinc dust, has an overflow with a very reduced content of solids relative to the reactor in which the very cementation takes place.

The second reactor, which is not essential, acts as a filter both for the traces of impurities in the solution, and for the solids/cements carried ahead. Additionally, it stops the redissolving of the cements.

Considering a flow rate of 100 cu·m/h of solution, in the two conventional stages 400+400=800 cu·m of installed filtering surface with plate filter press are needed. With the process of the present invention, 200 installed cu·m are enough.

To the purpose of better illustrating the invention, some Examples are given hereinafter.

EXAMPLE 1

Figure 9:
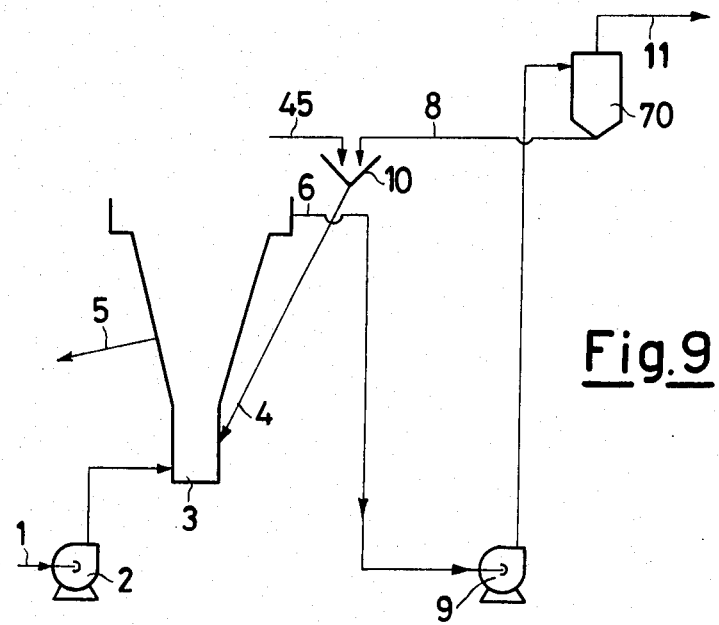

With reference to FIG. 9, which shows the first stage using one reaction vessel of the two stage process outlined in FIG. 8, the decanter tank (7) has been substituted by a cyclone (70).

A neutral solution (1) of zinc sulphate, outcoming from the leaching stop, having the following composition:

|  | Zn | Cd | Cu | Ni | Co |
| --- | --- | --- | --- | --- | --- |
| g/l | 130–140 | 0.80 | 0.15 | 0.115 | 0.007 | of specific gravity 1.32 kg/dm$^3$ and at the temperature of 54° C., is fed to the reactor (3). The equipment has a total volume of 0.95 cu·m, a base angle of the cone frustum relatively to the vertical of 12°, and a total height of 2.8 m.

The feeding flow rate of the raw solution is of 11 cu·m/h. The zinc dust (45) is added at the rate of 11 kg/h (1 g/l) and has the following granulometry:

0.1 < 80% < 0.25 mm

20% < 0.1 mm

The product outcoming (8) from the bottom of the cyclone is recycled, through the feeding vat (10) of the Zn dust, to the bottom of the reactor.

The analysis of the solutions in the points (6) and (11) is as follows:

Cu < 0.2 mg/l; Cd < 1 mg/l; Ni = 1–10 mg/l; Co = 7 mg/l.

The suspended solids are at the point (11) equal to 0.25–0.4 g/l. The cements (5) were batchwise extracted in the top portion of the bed as slurries with specific gravity 1.5–1.55 kg/dm$^3$ (200–250 g/l of solids). The cements contain 40% of Cd.

Figure 10:
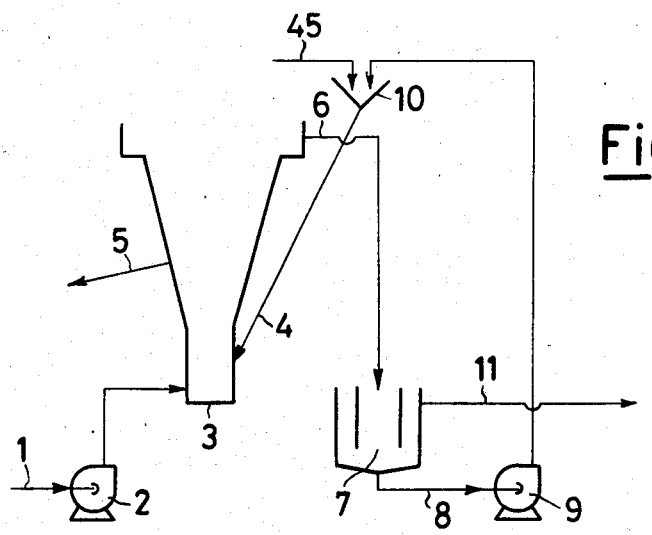

With reference to the FIG. 10, which shows the one reactor first stage of the process shown in FIG. 8, i.e., using a decanter tank (7) (0.2 cu·m), using the same solution the same analysis is obtained of the solution which has been previously shown at the points (6) and (11). The suspended solids at the point (11) are lower than or equal to 0.15 g/l.

By using a decanter tank a better recovery is obtained of the solids dragged by the overflow of the reactor.

EXAMPLE 2

With reference to FIG. 5, which shows a one stage process using one reactor, a solution of zinc sulphate outcoming from the leaching step, having the following average composition:

|  | Zn | Cd | Cu | Ni | Co |
| --- | --- | --- | --- | --- | --- |
| g/l | 130–140 | 0.55 | 0.2 | 0.135 | 0.008 | with specific gravity 1.32 kg/dm$^3$, is heated in (49) at the temperature of 60°–62° C. The feeding flow rate of the raw solution is 5.5 cu·m/h.

A quantity of antimony is added (46) of 5 mg/l. The added zinc dust is of the same type as in Example 1 and the quantity is of 17.6 kg/h (3.2 g/l).

The analysis of the solution in the points (53) and (58) is as follows:

Cu < 0.2 mg/l; Ni < 0.2 mg/l; Cu < 0.2 mg/l; Cu ≦ 1 mg/l; Sb < 0.01 mg/l.

The suspended solids at the point (58) are lower than or equal to 0.15 g/l.

Using a cyclone instead of the decanter tank, a solids content is obtained in the solution at the outlet of the hydrocyclone (which corresponds to the point (58) of the layout using the decanter tank) of 0.25–0.4 g/l.

In other terms, in this case too, by using the decanter tank a better recovery of the solids is obtained.

EXAMPLE 3

A solution out coming from a process similar to that shown in Example 1, i.e., outcoming from the first stage of a two stage process, in which the first stage is carried out using a single reactor, has the following composition:

|  | Zn | Cd | Ni | Co | Cu |
| --- | --- | --- | --- | --- | --- |
| g/l | 130–140 | ≦0.001 | 0.005 | 0.011 | 0.0002 | and specific gravity 1.32 kg/dm$^3$.

The second stage is shown in FIG. 8. Antimony (tartrate) (23) is added in the quantity of 6–8 mg/l and copper (sulphate) (22) is added in the quantity 0.2 g/l. The solution is heated at the temperature of 60°–65° C. in (25). The added zinc dust is of the same type as in Example 1 and its quantity is of 17.6 kg/h (3.2 g/l).

The analysis of the solution at the points (29) and (34) is as follows:

Cu < 0.2 mg/l; Ni < 0.2 mg/l; Co < 0.2 mg/l; Sb < 0.01 mg/l

Using a cyclone instead of the decanter tank the same analysis is obtained of the solution at the points (29) and (34).

A higher efficiency on the contrary has been found of the decanter tank in that the suspended solids in the solution outcoming from the hydrocyclone (corresponding to the point (14) for the layout with the decanter tank) are lower than 0.15 g/l.

EXAMPLE 4

With reference to FIG. 9 which shows the one reactor first stage of the two stage process outlined in FIG. 8, in this layout the decanter tank (7) has been substituted by a cyclone (70).

A neutral solution (1) of zinc sulphate, outcoming from the leaching step having the following composition:

|  | Zn | Cd | Cu | Ni | Co |
| --- | --- | --- | --- | --- | --- |
| g/l | 130–140 | 0.80 | 0.15 | 0.115 | 0.007 | with specific gravity 1.32 kg/dm³ and at the temperature of 54° C., is fed to the reactor (3). The equipment has a volume of 0.95 cu·m, a base angle of the cone frustum relatively to the vertical of 12°, a total height of 2.8 m.

The feeding flow rate of the raw solution is of 11 cu·m/h. The quantity added of the zinc dust (45) if of 11 kg/h (1 g/l) and it has the following granulometry:

0.1 < 70% < 0.25 mm

20% < 0.1 mm 0.25 < 10% < 0.5 mm

The product (8) outcoming from the bottom of the cyclone is recycled through the feeding tank (10) of the Zn dust, to the bottom of the reaction vessel.

The analysis of the solution at the points (6) and (11) is as follows:

Cu < 0.2 mg/l; Cd < 1 mg/l; Ni = 1–10 mg/l; Co = 7 mg/l.

The suspended solids are at the point (11) equal to 0.25–0.4 g/l. The cements (5) were batchwise extracted from the top portion of the bed, as slurries with specific weight 1.5–1.55 kg/dm³ (200–250 g/l of solids). The cements contain 40% of Cd.

With reference to FIG. 10, which shows the one reaction first stage of the process shown in FIG. 8, i.e., using the decanter tank (7) (0.2 cu·m), using the same solution, the same previously shown analysis is obtained of the solution at the points (6) and (11). The suspended solids at the point 11 are lower than or equal to 0.15 g/l.

By using the decanter tank a better recovery is obtained of the solids dragged by the overflow of the reactor.

EXAMPLE 5

With reference to FIG. 5, which shows a one stage process using a single reactor, a solution of zinc sulphate outcoming from the leaching step, having the following average composition:

|  | Zn | Cd | Cu | Ni | Co |
| --- | --- | --- | --- | --- | --- |
| g/l | 130–140 | 0.55 | 0.2 | 0.135 | 0.008 | with specific gravity 1.32 kg/dm³, is heated in (49) at the temperature of 60°–62° C. The feeding flow rate of the raw solution is 5.5 cu·m/h.

Antimony (46) is added in a quantity of 5 mg/l. The added zinc dust is of the same type as in Example 4 and the quantity added of it is of 17.6 kg/h (3.2 g/l). The analysis of the solution at the points (53) and (58) is as follows:

Cu < 0.2 mg/l; Ni < 0.2 mg/l; Cu < 0.2 mg/l; Cd ≦ 1 mg/l; Sb < 0.01 mg/l.

The suspended solids are at the point (50) lower than or equal to 0.15 g/l.

Using a hydrocyclone instead of the decanter tank a quantity of solids is obtained in the solution at the outlet of the hydrocyclone (corresponding to the point (58) for the layout with the decanter tank) of 0.25–0.4 g/l.

In other terms, in this case too the use of the decanter tank allows a better recovery of the solids to be obtained.

EXAMPLE 6

A solution outcoming from a similar process to that shown in FIG. 4, i.e., outcoming from the first stage of a two stage process, in which the first stage is effected by means of a single reactor, has the following composition:

|  | Zn | Cd | Ni | Co | Cu |
| --- | --- | --- | --- | --- | --- |
| g/l | 130–140 | ≦0.001 | 0.005 | 0.011 | 0.0002 | and specific gravity 1.32 kg/dm³.

The second stage is shown in FIG. 8. Antimony (tartrate) (23) is added in the quantity of 6–8 mg/l and copper (sulphate) (22) is added in the quantity of 0.2 g/l. The solution is heated at the temperature of 60°–65° C. in (25). The added zinc dust is of the same type as shown in Example 1 and its quantity is of 17.0 kg/h (3.2 g/l).

The analysis of the solution at the points (29) and (34) is as follows:

Cu < 0.2 mg/l; Ni < 0.2 mg/l; Co < 0.2 mg/l; Sb < 0.01 mg/l

Using a cyclone instead of the decanter tank the same analysis is obtained of the solution as regards the points (29) and (34).

A better efficiency has been observed on the contrary of the decanter tank in that the quantity of suspended solids in the solution at the outlet of the hydrocyclone (corresponding to the point (34) of the layout with decanter tank) are lower than 0.15 g/l.

As shown in the Examples 1, 2, 3, 4, 5 and 6, in the reactor the complete withdrawal is obtained of the impurities in the solution.

Such a result has been obtained by means of a single reactor.

In the practical industrial realizations, installing a second reaction vessel is advisable. The stream of the solution to be purified passes through both the reaction vessels, in a serially arrangement. The zinc dust is introduced partly in the 2nd reactor (20–30% of the total quantity needed), partly in the first reactor, together with the cements extracted from the bed of the 2nd reactor.

The bed inside the 2nd reactor, consisting nearly entirely of zinc, stops the residual impurities in the solution possibly escaped from the 1st reactor, as well as it stops the reduced amounts of cements escaped from the whole consisting of the 1st reactor and the relevant decanter, and dragged ahead.

The reasons why it is not preferred to provide a total countercurrent flow of the solution and of the zinc dust/cements are the following:

By not feeding the total needed quantity of dust to the 2nd reactor, this can operate under less severe conditions, and it can be avoided what is just a simple transfer of practically pure zinc dust from the 2nd reactor;

The zinc dust after having passed through the 2nd reactor is partly deactivated, thus impairing the purifying efficiency of the 1st reactor.

It is however possible to provide a total countercurrent flow of the solution and of the zinc dust by feeding all the needed quantity of zinc dust to the 2nd reactor of each stage.

We claim:

1. A process for purifying aqueous solutions of zinc sulphate containing one or more metal impurities selected from the group: Cu, Cd, Tl, Ni, Co. Ge, As, and Sb, which comprises cementing out the impurities by using zinc dust and an activator selected form the group consisting of Cu-As and Cu-Sb, wherein the cementation is carried out in at least one stage and at least two reactors disposed in a series or in parallel to each other, having a bottom portion of cylindrical shape, a cone frustum shaped intermediate portion and a top portion which is enlarged relative to the intermediate cone portion, the aqueous solutions of zinc sulphate containing the metal impurities being fed to the side wall of the cylindrically shaped portion with a speed in a range of from 0.02 to 0.07 m/s, and the zinc dust having a grit size of from 0.01 to 1 mm and activator being fed to the side wall of the cylindrically shaped portion above the feeding inlet of the zinc sulphate solution, and operating with a retention time within the range of from 3 to 12 minutes.

2. The process for purifying aqueous solutions of zinc sulphate of claim 1 wherein the cementation is carried out in two stages, in the first stage Cu, Cd, Tl and a portion of Ni being cemented with the zinc dust utilizing two reaction vessels; and in the second stage Co and the remaining of Ni being cemented with the zinc dust in the presence of copper combined with either arsenic or antimony utilizing two reactors.

3. The process for purifying aqueous solutions of zinc sulphate of claim 2 wherein in the first stage the solution to be purified is not heated, and in the second stage the solution removed from the first stage is heated before being fed to the first reactor of the second stage at a temperature within the range of from 60° to 70° C.

4. The process for purifying aqueous solutions of zinc sulphate of claim 1 wherein the cementation is effected in a single stage cementing of Cu, Cd, Tl, Co, Ni, Sb, As, Ge with zinc dust and in the presence of copper combined with either arsenic or antimony utilizing a single reaction vessel.

5. The process for purifying aqueous solutions of zinc sulphate of claim 4 wherein the solution to be purified is heated at a temperature within the range of from 60° to 70° C.

6. The process for purifying aqueous solutions of zinc sulphate of claim 1 wherein the cementation is carried out in a single stage cementing of Cu, Cd, Tl, Co, Ni, Sb, As, Ge using zinc dust and in the presence of copper combined with either arsenic or antimony utilizing two reactors.

7. The process for purifying aqueous solutions of zinc sulphate of claim 6 wherein the solution to be purified is heated at a temperature within the range of from 60° to 70° C. before being fed to the first reaction vessel.

8. The process for purifying aqueous solutions of zinc sulphate of claim 1 wherein the cementation is carried out in two stages; in the first stage Cu, Cd, Tl and a portion of Ni being cemented with the zinc dust using two reactors, and in the second stage Co and the remaining Ni being cemented with zinc dust in the presence of copper combined with either arsenic or antimony, using one reactor.

9. The process for purifying aqueous solutions of zinc sulphate of claim 8 wherein in the first stage the solution removed from the first stage is not heated, and in the second stage the solution removed from the first stage is heated before being fed to the reactor at a temperature between 60° and 70° C.

10. The process for purifying aqueous solutions of zinc sulphate of claim 1 wherein the cementation is carried out in two stages; in the first stage Cu, Cd, Tl and a portion of Ni being cemented with the zinc dust using a reactor, and in the second stage Co and the remaining Ni being cemented with zinc dust and in the presence of copper combined with either arsenic or antimony using two reaction vessels.

11. The process for purifying aqueous solutions of zinc sulphate of claim 11 wherein in the first stage the solution to be purified is not heated, and in the second stage the solution removed from the first stage is heated before being fed to the first reactor of the second stage at a temperature within the range of from 60° to 70° C.

12. The process for purifying aqueous solutions of zinc sulphate of claim 1 wherein the cementation is carried out in two stages; in the first stage Cu, Cd, Tl and a portion of Ni are cemented with the zinc dust using a single reactor, and in the second stage Co and the remaining Ni are cemented with the zinc dust and in the presence of copper combined with either arsenic or antimony using a single reactor.

13. The process for purifying aqueous solutions of zinc sulphate of claim 12 wherein in the first stage the solution to be purified is not heated in the second stage, and the solution removed from the first stage is heated before being fed to the reaction vessel at a temperature within the range of from 60° to 70° C.

14. The process for purifying aqueous solutions of zinc sulphate of claim 1 wherein in the cone frustum shaped portion an equilibrium is established between the settling speed of the solid particles and the upwards speed of the solution to be purified thus creating a fluid bed of cement particles and zinc particles.

15. The process for purifying aqueous solutions of zinc sulphate of claim 15 wherein the fluid bed has a concentration of suspended solids within the range of from 100 to 500 g/l.

16. The process for purifying aqueous solutions of zinc sulphate of claim 1, wherein the zinc dust has a granulometry between 0.01 and 0.5 mm.

17. The process for purifying aqueous solutions of zinc sulfate of claim 1 wherein the base angle of the cone frustum shaped portion relatively to the vertical is within the range of from 10° to 15°.

18. The process for purifying aqueous solutions of zinc sulfate of claim 1 wherein the speed is referred to the range of from 0.03 to 0.04 m/s.

19. The process for purifying aqueous solutions of zinc sulphate of claim 15 wherein the fluid has a concentration of suspended solids within the range of from 200 to 400 g/l.

20. The process for purifying aqueous solutions of zinc sulfate of claim 1 wherein the cementation is carried out in one stage and in two reactors.

* * * * *